United States Patent [19]

Capdevila

[11] Patent Number: 4,716,823

[45] Date of Patent: Jan. 5, 1988

[54] JUICE EXTRACTOR FOR INDUSTRIAL USE

[75] Inventor: Guillermo Capdevila, Fuenterrabia, Italy

[73] Assignee: Sammic, S.A., San Sebastian, Spain

[21] Appl. No.: 871,260

[22] Filed: Jun. 6, 1986

[51] Int. Cl.⁴ ............................................. A23N 1/00
[52] U.S. Cl. ........................................ 99/510; 99/511; 241/36; 241/282.2; 366/601
[58] Field of Search .......................... 99/495, 509–513, 99/486, 492; 366/601, 197, 199, 206; 241/33, 36, 37, 282.2

[56] References Cited
U.S. PATENT DOCUMENTS 4,297,038 10/1981 Falkenbach ..................... 366/601 X Primary Examiner—Timothy F. Simone
Attorney, Agent, or Firm—Laurence R. Brown

[57] ABSTRACT

An industrial type juice extractor is housed in a light weight cylindrical outer shell, such as aluminum. An electric drive motor housed by the shell has its speed controlled by a linear potentiometer control on the outside of the shell. A liquidizing head at the top of the upright cylinder receives products and discharges liquid from a bottom pipe. The motor is activated by a microswitch inside the cylinder actuated by an external movable lever arm-cam arrangement which simultaneously seals the upper.

5 Claims, 3 Drawing Figures

JUICE EXTRACTOR FOR INDUSTRIAL USE

TECHNICAL FIELD

This invention relates to industrial juice extractors.

BACKGROUND OF THE INVENTION

Exhaustive research work has been carried out with the aim of obtaining a juice extractor of minimum cost with regard to manufacture and of high performance and simplified structure, which is as practical as possible. Such research work has led to the project and construction of the object referred to, the characteristic features and technical specifications of which are discussed below and illustrated with the explanatory diagrams accompanying the present report.

DISCLOSURE OF THE INVENTION

Taking the premises of quality and practically alluded to as a starting point, the juice extractor we are proposing is constructed with a basic shell, preferably cylindrical in shape, which is optionally obtained by extrusion and made of aluminium to reduce weight. Such shell consists of an upright tubular section inside which is housed the electric motor with adequate clearance together with its fittings, as well as the sealing ring, the potentiometer for changing the speed from 3,000 to 6,000 r.p.m. and the master switch, it being possible to activate the last two components from outside.

Two components which form essential parts of the extractor since they are determining factors for its practical use, are attached to the upper—part or head of the juice extractor. One of these is the basin in which the products to be liquidised are placed and contains the shredding and centrifugal devices for obtaining the juice from the fruit; the second part concerns the lid which is supplied with a large handle connected to the part covering the cylindrical section formed by the shell and the support for the motor. This handle has a right angle in its upper section to make its use as a lever easier for sealing the basin tightly with the lid by means of complementary circular toric joints. As the extractor is sealed, so the handle activates a microswitch which connects the electric circuit to start the appliance, and, alternatively, to stop it when such lid is opened.

As cooling devices for the juice extractor, the base of the shell is supplied with fins with openings which enable air to penetrate easily and flow through the chamber between the motor and the aforementioned shell, thus providing adequate ventilation with the air leaving through the gap between such shell and the cover supporting and protecting the motor with its complementary sealing gland.

THE PREFERRED EMBODIMENT

A suitable pipe has been designed to allow for the exit of the juice obtained, located on the base of the aforementioned basin containing the chopping and centrifugal devices. Such pipe is cylindrical in shape, preferably with a downward slant and oblique cut at its free end so as to—facilitate the exit of the liquid extracted.

A cavity has been made in the upper section or lid of the extractor in which the pulp accumulates from the products being liquidised once these have been shredded and squeezed by centrifugal action, with the pulp passing out through the wide outlet or spout that forms a continuation of such lid and also slants downwards to empty into an auxiliary container designed for such use.

In order to make it easier to pass the products to be liquidised through the feed tube located on one side of the lid, a pusher has been included. This is preferably shaped like a truncated pyramid with a rectangular section and dulled edges.

A spring collet, placed over the component emptying out the pulp, determines the appropriate functional orientation and fixture of such element.

The stand of this improved juice extractor for industrial use has been constructed with a short, truncated cone-shaped part which is of lesser—diameter than the shell and screwed to this in such a way that it forms an integral part of it. Such stand is extended outwards horizontally at the base of this to form a circular rim in a concentric position with the essential non-slip flexible element underneath designed to ensure the stability of the extractor as a whole; furthermore, it is equipped with a cable-storage compartment in its truncated cone-shaped neck, constituting an additional feature of the practicality of the object proposed.

The following detailed description refers to the accompanying diagrams which illustrate the procedure we consider to be the most suitable and in accordance with the preceding report. Such procedure is intended as an example, without being restrictive in any way, since practical experience may suggest slight modifications without altering the basic invention itself.

Figure 1:
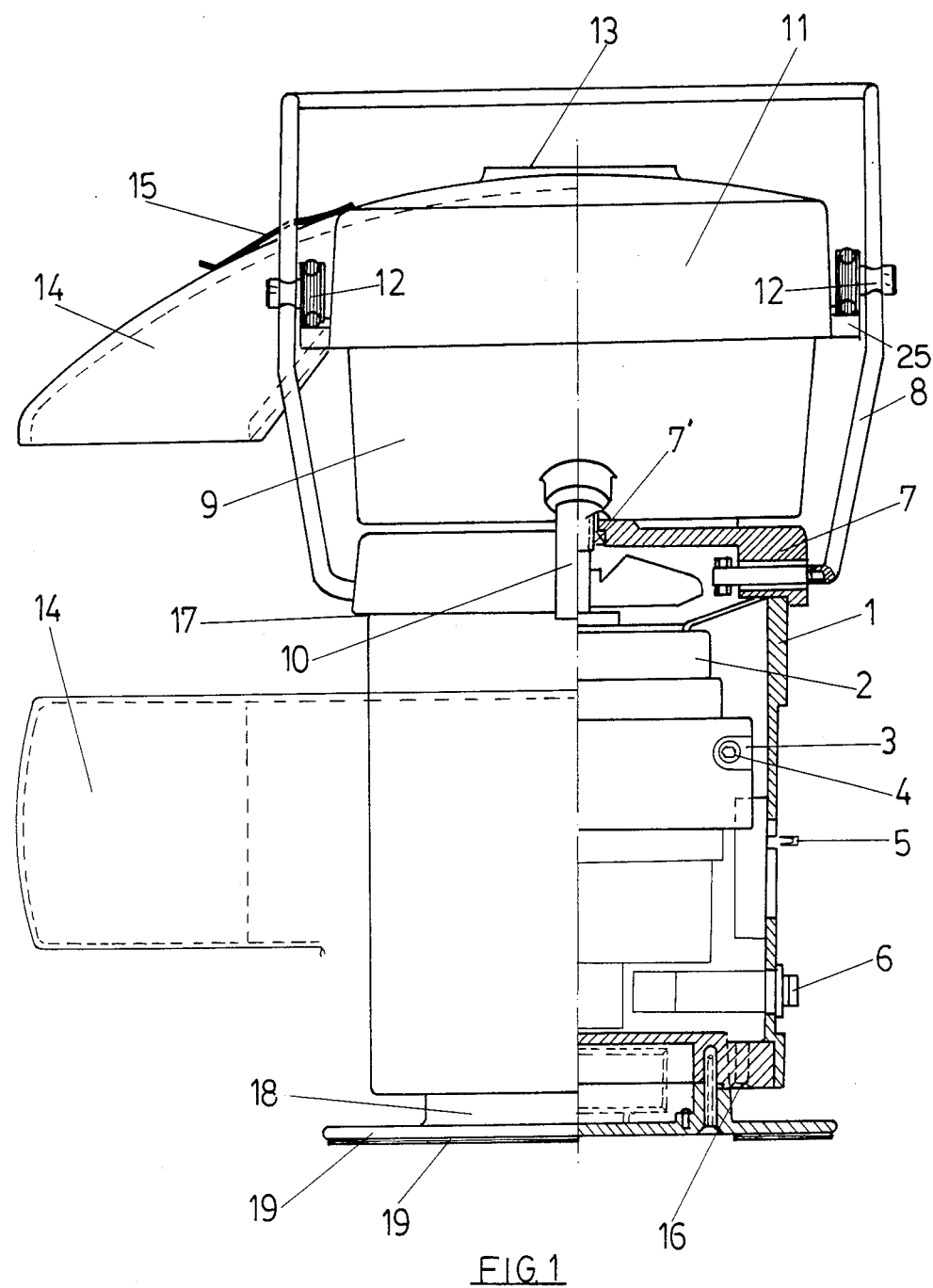
FIG. 1 provides a free side view of the juice extractor with a—quadrantal section in the cylindrical shell and its bases.

Illustrated in FIG. 1 are the shell -1- surrounding the motor -2- and its complementary parts, including the flange -3- and the fixing screw -4-, the potentiometer -5- changing the centrifugal speed and the master safety switch -6- that supplies electricity to the motor. Over the aforementioned shell is located part -7- supporting and protecting the motor, together with the gland -7'- with the microswitch which is illustrated in detail in FIG. 3 being housed inside beneath the protective support and connected to one end of the handle -8- which activates such microswitch to start or stop the motor of the extractor, according to which position it is in.

The position of the basin or shredding and centrifugalization area -9- can be seen in the head or upper part of the appliance, supplied at its base with a tubular pipe -10- for the exit of the juice, the lid -11- with the fittings -12- carried by the handle and for fixing this in the raised position is also visible as is the feed tube -13- for addition of the product to be liquidised and the outlet -14- for the pulp or waste resulting from centrifugal action, with such outlet being supplied with a collet -15- which fixes it in the right position. The fittings 12 engage with protuberances 25 on lid 11 to urge the lid into tight relationship with basin area 9.

Further down, beneath the base of the shell, there are fins -16- supplied with openings designed to allow the air to penetrate for cooling the motor by surrounding this as it rises and then leaving through the gap -17- formed by such shell -1- and part -7-. Finally, the stand of the extractor can be seen with a short section shaped like a truncated cone -18- and its external protuberance -19- in the shape of a concentric circular rim, —equipped with the corresponding non-slip device -19'- underneath.

Figure 2:
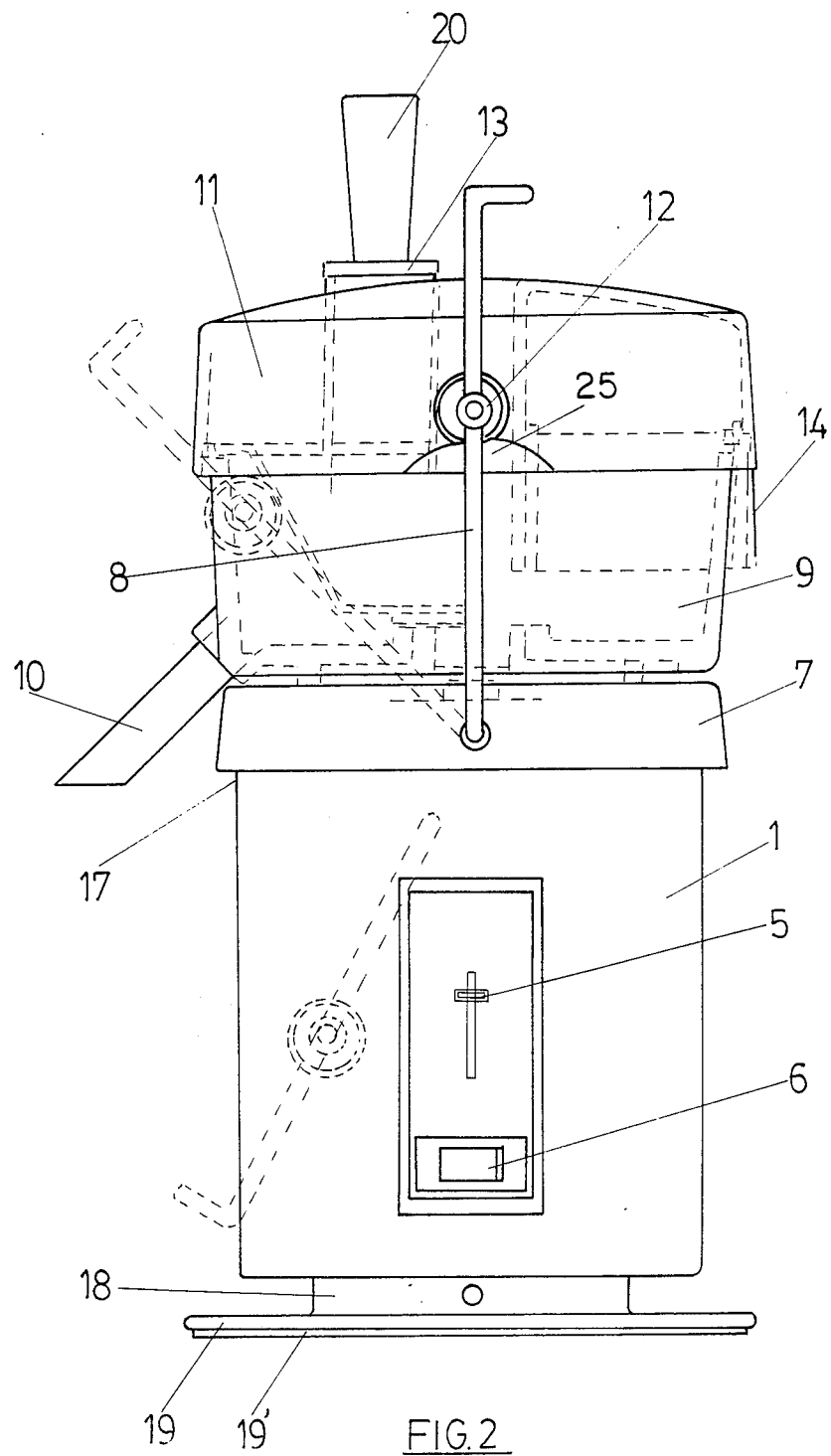
FIG. 2 shows another free side view at a right angle to the view offered in FIG. 1.

In FIG. 2, apart from the details indicated with numbers -1-, -5-, -6-, -7-, -8-, -9-, -10-, -11-, -12-, -13-, -14-, -17-, -18-, -19-, and -19'- already commented on, the pusher -20- facilitating the introduction of the product in the extractor can be seen easily.

Figure 3:
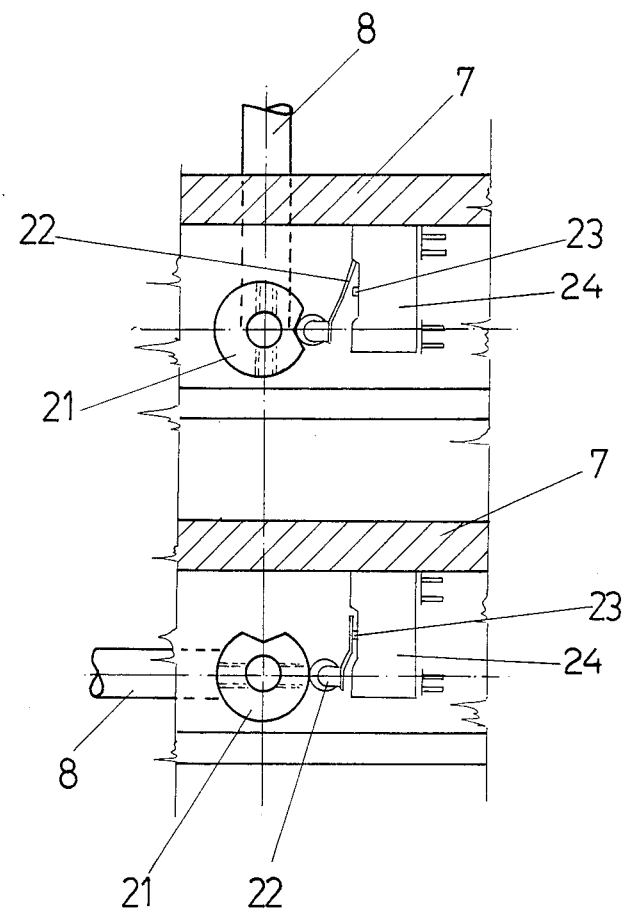
FIG. 3 provides a detailed illustration of the intenal microswitch device with the on/off positions.

The functional characteristics of the microswitch 24 housed inside the appliance next to one end of the handle -8- below the protective support, according to the description of FIG. 1, are represented in FIG. 3 by a circular cam -21- with an angular notch that, by means of a connecting device -22- closes or opens the circuit with a button -23- that stops and starts the extractor, with the handle being moved to the vertical raised position designed for such purpose when the motor is activated, and to the horizontal or lower position when this is to be stopped, once the product has been liquidised as desired.

This improved juice extractor for industrial use is characterized first and foremost as comprising a basic shell which is cylindrical in shape and optionally obtained by extrusion, preferably made of aluminum so as to reduce weight, forming an upright tubular component housing the electric motor with the appropriate clearance, along with its fittings, the sealing ring, the potentiometer for changing the centrifugal speed from 3,000 to 6,000 r.p.m. and the master safety switch, it being possible to activate these last two accessories from outside.

The upper section or head consists of two essential parts enabling the liquidizing mechanism to work, one of which is the basin 9 in which the products are placed to be liquidized and contains the shredding or centrifugal devices for obtaining the juice; the second part is the lid 11 which is equipped with a large handle 8 connected at the ends to the part 7 covering the cylindrical body of the aforementioned shell 1, such handle (8) is designed with a right angle in its upper section to make it more functional and facilitate its use as a lever for achieving a tighter seal between the basin and the lid, helped by the presence of complementary circular fittings 21 carried by the handle when the lid 11 is closed, the handle 8 also activates a microswitch 24 at the same time which connects with the electric circuit thus starting the motor 2, and, alternatively, stops the motor when such lid is opened.

Fins 16 have been included as cooling elements on the base of the shell, with openings enabling the air to penetrate easily and flow through the shell 1 between the motor and the shell wall and to pass out through the gap 17 formed by such shell 1 and the cover 7 protecting the motor with its complememtary sealing gland 7.

A cylindrical pipe 10 has been included, fitted to the bottom of the basin 9 with a downward slant and cut obliquely across its free end so as to facilitate the exit of the juice.

There is a cavity in the upper section or lid 11 of the extractor, in which the accumulated pulp is housed from the products that have been shredded and crushed by centrifugal action. Such pulp is pushed out through the wide outlet 14 which forms a continuation of the lid 11, and also slants downwards to empty out into a suitable container.

Passing the product to be liquidized through a feed tube 13 located on one side of the lid is made easier by the inclusion of a pusher 20, preferably in the shape of a truncated pyramid, with rectangular section and dulled edges, which has been designed to fit such feed tube perfectly.

A spring collet 15 located over the pulp outlet 14 secures the outlet in the right direction and functional position.

The stand consists of a short truncated cone-shaped element 18 of lesser diameter than shell 1. Element 18 can be screwed to the shell so as to form an integral part, and ends in a horizontal protrusion in the form of a concentric circular rim 19 with a non-slip flexible strip 19 underneath to keep the unit stable, with the truncated cone-shaped element 18 being reserved for cable storage.

I claim:

1. An improved juice extractor for industrial use, comprising in combination, a basic shell which is cylindrical in shape forming an upright tubular component for housing an electric motor, a motor supporting ring at one end of the shell, a potentiometer for changing the motor speed, a master safety switch for controlling the supply of electrical power to the motor, an upper head section on said shell, said head section including a basin in which products are placed to be liquidized for obtaining the juice and including a lid overlying the basin, a closure part for said shell, a generally U-shaped handle having a central portion and two ends, the ends being pivoted to the shell and the central portion adapted to overlie the lid, the handle including fittings for engaging the lid when closed, a microswitch mounted inside the shell, and internally projecting actuating means carried by the handle to actuate the microswitch for starting the motor by pivoting said handle to overlie and engage the lid when the lid is closed.

2. The juice extractor of claim 1 having a base fitting into the shell with openings therein for passing air past the motor, and air exit passageways in said supporting ring.

3. The juice extractor of claim 1 having a juice discharge pipe extending from the basin for exit of juice and a pulp outlet for removal of pulp, said pulp outlet extending outwardly from said lid.

4. The juice extractor of claim 3 having a feed tube in said lid for inserting a product from which juice is to be extracted.

5. The juice extractor of claim 1 having a base closure for the shell, said base closure including a circular rim stand and a reduced diameter neck for winding thereon a motor power cable.

* * * * *